United States Patent [19]

Boudou et al.

[11] Patent Number: 6,009,472
[45] Date of Patent: Dec. 28, 1999

[54] PROCESS FOR TRANSFERRING DATA BETWEEN NODES IN A MULTINODAL INFORMATION SYSTEM

[75] Inventors: Alain Boudou, Vert; Henriette Derne, Verneuil sur Seine, both of France

[73] Assignee: Bull, S.A., France

[21] Appl. No.: 08/684,996

[22] Filed: Jul. 22, 1996

[30] Foreign Application Priority Data

Jul. 21, 1995 [FR] France ................................. 95 08849

[51] Int. Cl.⁶ ............................................ G06F 15/16
[52] U.S. Cl. ..................... 709/232; 709/201; 709/230
[58] Field of Search .................... 395/200.31, 200.47, 395/200.62, 200.6, 200.63, 200.64

[56] References Cited

U.S. PATENT DOCUMENTS

| | | | |
|---|---|---|---|
| 4,220,990 | 9/1980 | Alles | 395/557 |
| 4,272,819 | 6/1981 | Katsumata et al. | 504/130 |
| 4,814,980 | 3/1989 | Peterson et al. | 395/200.46 |
| 4,939,724 | 7/1990 | Ebersole | 370/407 |
| 5,036,459 | 7/1991 | Den Haan et al. | 395/200.67 |
| 5,136,718 | 8/1992 | Haydt | 395/200.45 |
| 5,212,778 | 5/1993 | Dally et al. | 711/218 |
| 5,245,704 | 9/1993 | Weber et al. | 395/200.45 |
| 5,461,718 | 10/1995 | Tatosian et al. | 395/416 |
| 5,500,943 | 3/1996 | Ho et al. | 395/375 |
| 5,560,029 | 9/1996 | Papadopoulos et al. | 395/800.25 |
| 5,748,806 | 5/1998 | Gates | 395/306 |
| 5,751,955 | 5/1998 | Sonnier et al. | 395/200.19 |
| 5,754,764 | 5/1998 | Davis et al. | 395/200.01 |

FOREIGN PATENT DOCUMENTS

| | | |
|---|---|---|
| 0603994 | 6/1994 | European Pat. Off. . |
| 0646876 | 5/1995 | European Pat. Off. . |

Primary Examiner—Mehmet B. Geckil
Attorney, Agent, or Firm—Kerkam, Stowell, Kondracki & Clarke, P.C.; Edward J. Kondracki

[57] ABSTRACT

In a multinode information system (SYS), a processor (Pxm) of a first node (Nx) emits a message of predetermined size (MESS) in the form of a write operation in the communication module (ISLx) of the first node and transmits it to the communication module (ISLy) of a second node (Ny), where it is stored in a queue of messages received (FIFO-MGT), in the order of their reception, then dequeued by a processor (Pyn) of the second node (Ny) in the form of a read operation in the communication module (ISLy) of this node so that the information contained in the message can be processed.

14 Claims, 10 Drawing Sheets

PROCESS FOR TRANSFERRING DATA BETWEEN NODES IN A MULTINODAL INFORMATION SYSTEM

CROSS REFERENCE TO RELATED APPLICATIONS

This application is related to application Ser. No. 08/685,931 of Alain Boudou and Yvon Gressus, entitled Process For Transferring Data Between Nodes in a Multinodal Information System filed concurrently herewith and corresponding to French Application No. 95 08848, filed Jul. 21, 1995. The subject matter of said U.S. application is incorporated herein by reference.

FIELD OF THE INVENTION

The object of the invention is a process for transferring messages between remote information systems known as nodes, which are interconnected by means of electrical or optical transmission links so as to constitute a multinode information system.

The invention is particularly adapted to multinode information systems in which each of the nodes runs its own operating system and/or has several processors, thus constituting multiprocessor multinode systems, and/or in which the links are dedicated to communication between these nodes. The links can carry the messages either in the form of streams of bits in series (serial links) or in the form of successive slices of bits disposed in parallel (parallel links).

The invention is also well adapted to the transfer of messages of predetermined size. The messages can represent commands or data. The messages of predetermined size are distinguished from messages of variable, undefined size.

The corollary subjects of the invention are a multinode information system which implements the process and an integrated circuit for the implementation of the process or the embodiment of the information system.

DESCRIPTION OF RELATED ART

In an information system in which tasks are distributed in several nodes, or in which the execution of these tasks is distributed in several nodes, it is necessary to obtain the fastest communication possible between these nodes. This requires the use of a message transmission mechanism with a high throughput—estimated at a number of messages per second—and with a short transfer time, particularly for unsolicited messages of small size. This type of message allows the synchronization of the nodes, the transfer of data items or the transmission of commands. In addition to high communication performance, it requires security capabilities to prevent any error or loss of messages and sequencing capabilities, since the messages must be read in the same order that they were sent.

In general, the nodes of an information system communicate by means of a local network and communication protocols which do not make it possible to obtain both the required capabilities and the desired speed for this type of message.

Another problem appears in certain standard systems in which the emitter controls the transmission flow. These systems are called data push systems. In these systems, the emitter does not have visibility of the capacity for receiving the data it sends, so that the arrival of data in the receiver runs the risk of overloading the receiver. In fact, the receiver cannot, in any simple way, control the flow of data it receives and must execute all the messages it receives or lose messages. One solution to the problem which arises when there is a difference between the flow of data received and the speed at which these data are stored in memory consists of storing the data transiently in an intermediate buffer. However, this solution diminishes the performance of the receiver.

In a standard system, when a first node is communicating with a second node, it cannot communicate with a third node at the same time; the second node cannot communicate with the first node and a third node cannot communicate with either the first or the second node. This limitation greatly reduces the processing capacity of the system when it must transfer data between several nodes.

The presence of several processors in each node further exacerbates the problem. At a given instant, the processors of a node, even all the processors of the node, can be involved in different respective procedures for executing requests for the transfer of data which are located in other nodes. All of these procedures must therefore be executed in parallel, that is, independently from one another. Currently, this requires the internodal communication module of the node to have a high processing capacity.

This problem is aggravated by the bidirectionality which is desirable in transmission between nodes. In this case, a node can actually be simultaneously involved in procedures for executing requests within the node and in procedures for executing requests outside the node for the transfer of data located in this node.

A problem also appears in other standard systems in which an emitting node sends data to a receiving node in order to write them into the memory of this node at an address designated by the emitter. In this case, an address error made by the emitting node can cause an irrecoverable error in the data which rightfully belong to the remote node.

SUMMARY OF THE INVENTION

The object of the invention, therefore, is to substantially increase the execution speed of the transfers of messages between nodes, no matter what the nature of the internodal transmission and the operating systems of the nodes.

Another object is to ensure the security of the messages transferred.

Another object is to ensure sequencing.

Yet another object is to allow the receiving node to control the flow of data it receives so that it can process them without a loss of data and without a reduction in the performance of the receiving node.

Another object of the invention is to simply and effectively enable the parallel execution of requests for the internodal transfer of messages requested by several processors in the same node.

Another object of the invention is to simply and efficiently enable the bidirectional execution of requests for the internodal transfer of data, and more particularly when the parallel execution of requests in multiprocessor nodes is added.

Another object is to ensure the protection of the data stored in the memories of the nodes by preventing an error in the execution of a data transfer request from destroying other data in the memories.

The subject of the invention is a process for transmitting a message in an information system comprising processors distributed in at least a first node and a second node, each of which has a module for communication with another node by means of a transmission link, characterized in that the message, which has a predetermined size, is emitted by a processor of the first node in the form of a write operation in the communication module of the first node and is transmitted, through the communication link, to the communication module of the second node where it is stored in a queue of messages received in the order of its reception, and in that a processor of the node which incorporates the queue retrieves the message from the queue in the form of a read operation in the communication module of this node so that process the information contained in the message can be processed, which enqueuing and dequeuing operations are carried out sequentially.

The result is an information system comprising processors distributed in at least a first node and a second node, each of which has a module for communication with another node by means of a transmission link, characterized in that at least these two nodes implement the process defined above.

A corollary subject of the invention is an integrated circuit, characterized in that it incorporates a communication module for implementing the process defined above.

BRIEF DESCRIPTION OF THE DRAWINGS

The characteristics and advantages of the invention appear in the following description, given by way of example and made in reference to the appended drawings.

In the drawings.

DESCRIPTION OF THE PREFERRED EMBODIMENTS

1. Preliminary Presentation and Definitions

Figure 1:
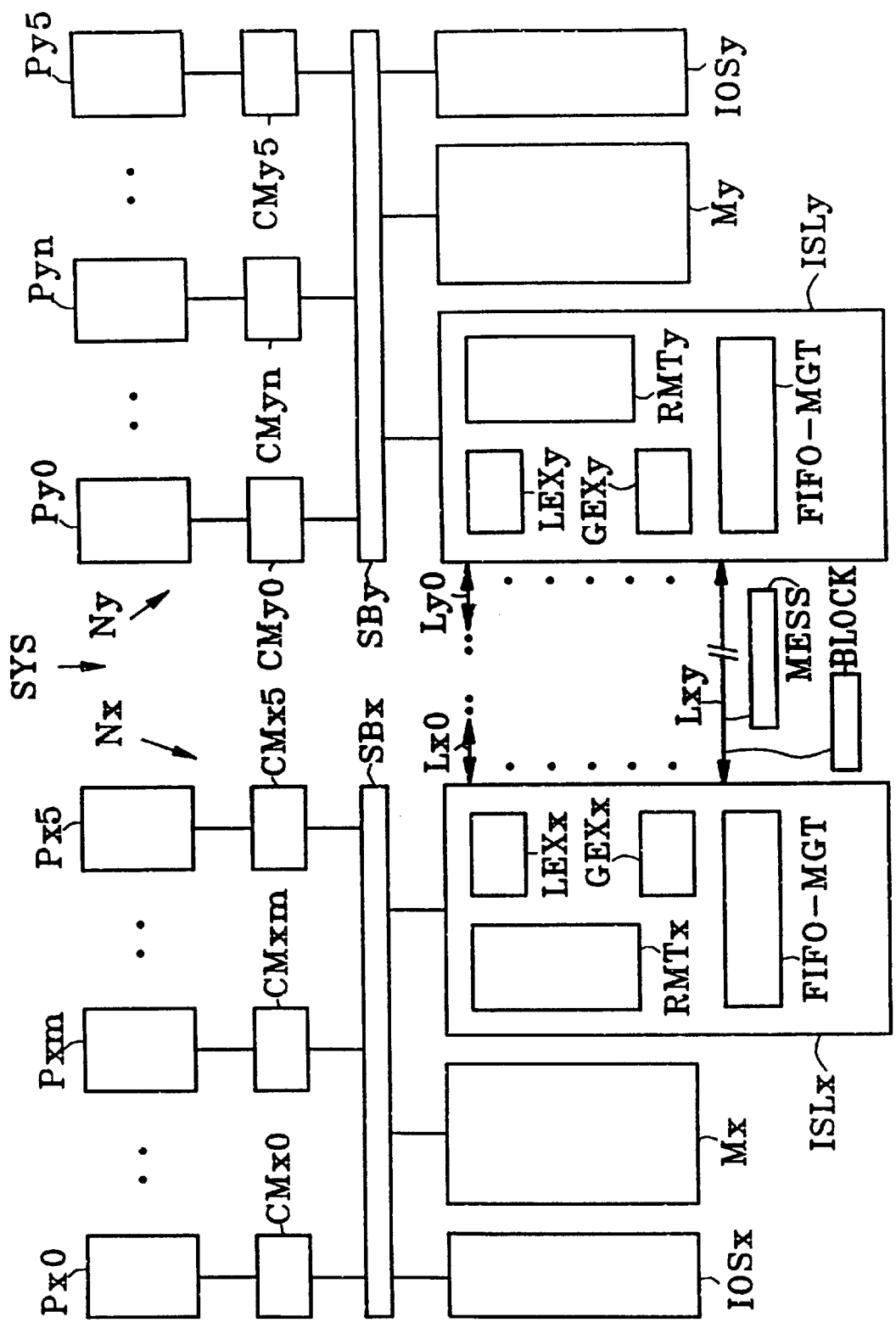
FIG. 1 is a block diagram illustrating the structure of a multinode information system according to the invention.

The information system SYS represented in FIG. 1 comprises a plurality of processing nodes N (Nx, Ny, etc.), each of which has its own operating system and therefore functions independently from the others. The nodes N are linked to one another by transmission links L. In the example illustrated, the links L are bidirectional serial data transmission links and they contain in their references the indications of the numbers of the two nodes linked by the respective links so that, for example, Lxy designates the link which links the nodes Nx and Ny. The use of internodal serial data transmission links is less voluminous in terms of connections than the standard parallel data transmission links. It therefore allows the utilization of a greater number of point-to-point connections with other nodes and the transmission of a greater number of simultaneous communications.

Each node comprises a plurality of processors P, the references of which indicate the number of the node and possibly also the sequence number of the processor in the node. Thus, Pxm designates the processor of the node Nx with the sequence number m. The system SYS embodied, which serves as an example, comprises eight nodes with six processors each. In the example illustrated, each processor P is considered to be connected to a cache memory CM, which can be integrated into the same integrated circuit as the processor. Each node also comprises a system bus SB connected to the cache memories CM, to a memory M, to an input-output subsystem IOS and to a module for communication between nodes ISL (Inter System Link). Each of these components in the nodes Nx and Ny illustrated is assigned the index x or y of the corresponding node. The module ISLx, like all the other modules in the system, has an internal interface with the system bus SBx of the node Nx as well as an external interface with the links L which link the node Nx to the other seven nodes in the system, including the link Lxy. Each module ISL is included in the integrated circuit IC indicated in FIG. 9.

Figure 2:
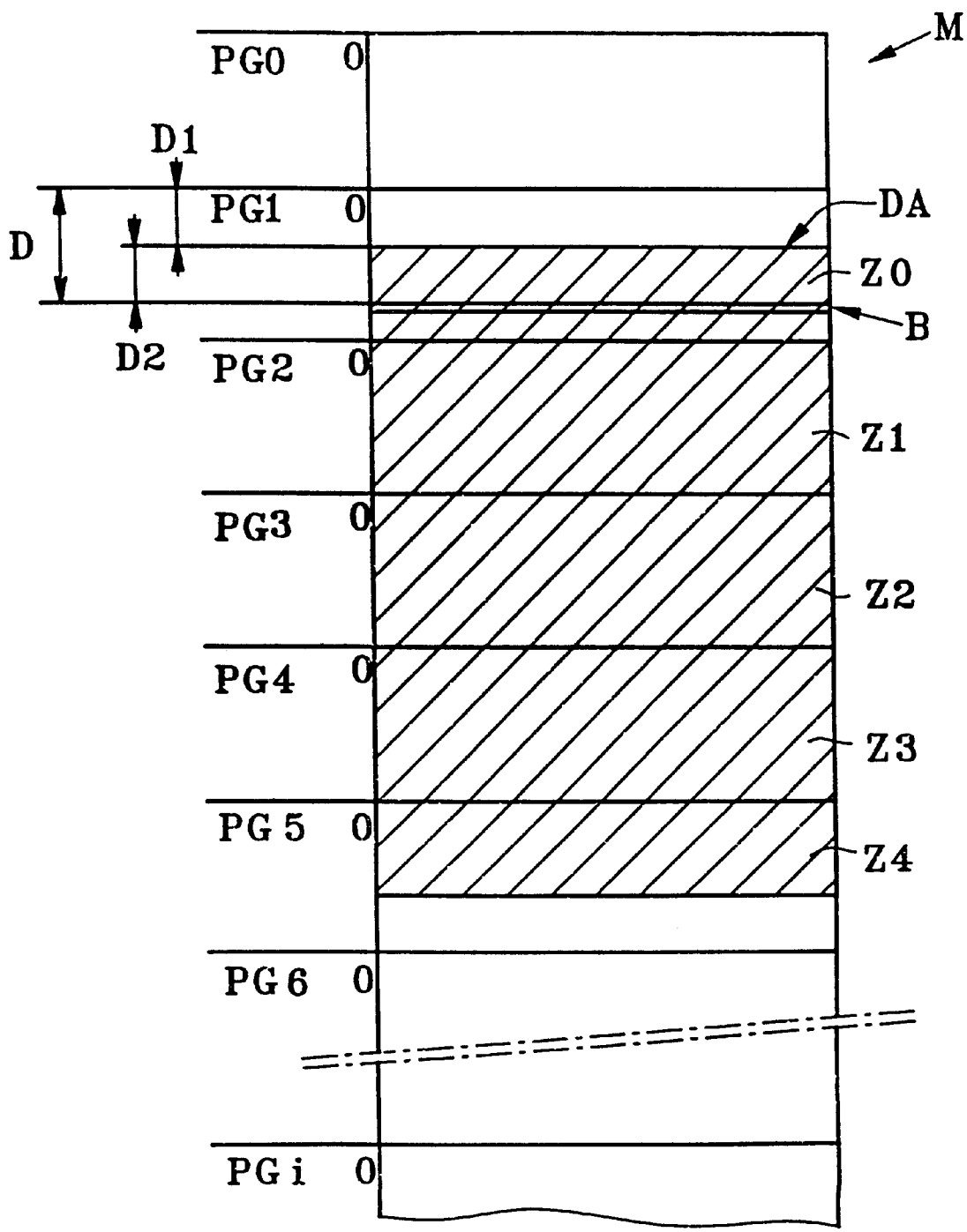
FIG. 2 is a partial schematic view of the main memory of a node in the system represented in FIG. 1.
Figure 3:
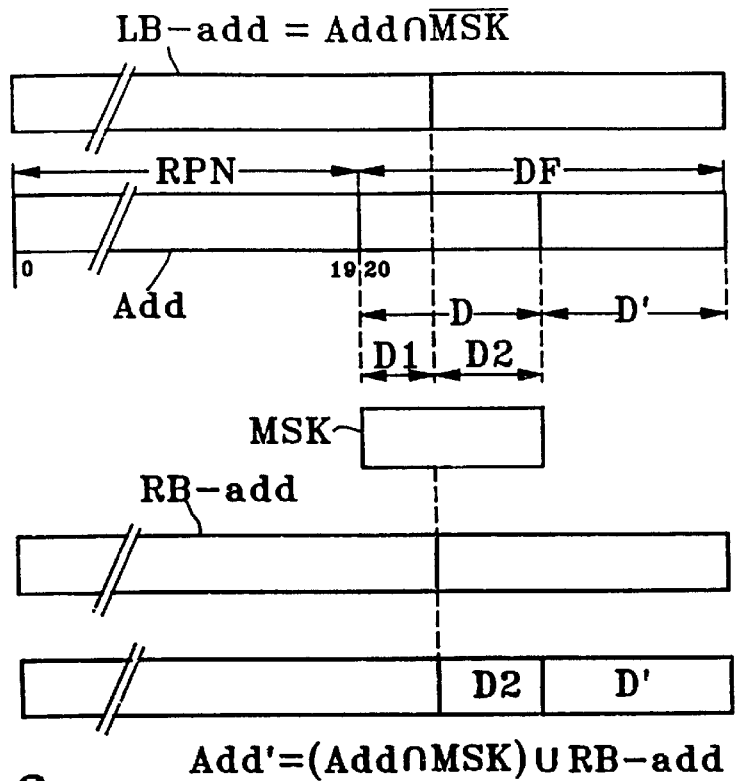
FIG. 3 is a schematic view of the structure of a physical address used in the system represented in FIG. 1, and it illustrates a utilization of addresses of this type to perform an internodal reading of data in accordance with the data transfer process described in reference to FIG. 6.

FIGS. 2 and 3 will help to define the words used below, in order to avoid any confusion. FIG. 2 partially and schematically illustrates a main memory M of one of the nodes N. The memory M is ordinarily divided into a sequence of pages PG (PG0, PG1, . . . , PGi, etc.), for example with 4 kilobytes each. In the memory M, the name Data Area (DA) is given to the portion of the memory which contains the data requested. The area DA can be less than or greater than one page. The area DA illustrated comprises three complete pages PG2, PG3, PG4 and two respective partial end pages PG1 and PG5. A data zone Z is the portion of the data in one page of the area DA. Thus, the area DA illustrated comprises five data zones Z0–Z4, in which Z0 and Z4 are the portions of the respective terminal pages PG1 and PG5 and Z1–Z3 are formed of the respective complete pages PG2, PG3 and PG4. Each page is itself divided into data blocks B, also called Cache Lines. Each block B constitutes a unit of data to be exchanged between memories and cache memories as well as between cache memories.

Copies of the blocks B are managed by the hardware in accordance with a protocol which makes it possible to maintain the consistency of the copies. Each block B ordinarily has a size of thirty-two or sixty-four bytes. Each byte has a corresponding physical address and logical address.

FIG. 3 illustrates an example of the structure of a physical address Add of a byte, which is transmitted through a system bus SB. The address Add is made of 32 bits, the first twenty of which bits 0:19 constitute a field RPN (Real Page Number), with the last twelve bits forming a displacement field DF. The field RPN represents the number of the real page RPN which contains the byte. The first six bits 20–25 of the field DF represent the displacement (offset) D of the block which contains the byte. The displacement D of a block B defines the position of the block relative to the beginning of the page which contains the block (displacement 0 indicated in FIG. 2). The displacement D of a block B often breaks down into a part D1 of most significant bits which defines the displacement of a zone (the zone Z0 in FIG. 2) and a part D2 made of least significant bits which indicates the displacement of the block within the zone. The last six bits 26:31 of the displacement field DF define the displacement D' of the byte in the block B. The logical address is that seen by the program at the level of the instructions defined below. This address is transformed by the processor, which executes the instruction as a physical address. This transformation is managed by the operating system. Finally, in reference to FIG. 1, a packet MESS is defined as a message transfer unit and a packet BLOCK is defined as a data transfer unit in the form of a block B, which two packets MESS and BLOCK travel through a link Lxy between two nodes Nx and Ny.

In another definition, a specific program which a processor must execute through a sequence of instructions is called a macroinstruction. The information system SYS which serves as an example of embodiment of the invention is an RISC (Reduced Instruction Set Computing) type of system. The processors in each node N are of this type and are known by the trademark name PowerPC registered by the US company International Business Machines, Inc. As its name indicates, the RISC technology uses few instructions, among which LOAD designates a read instruction corresponding to an input into the processor which executes the instruction, while STORE designates a write instruction corresponding to an output from the processor.

Figure 4:
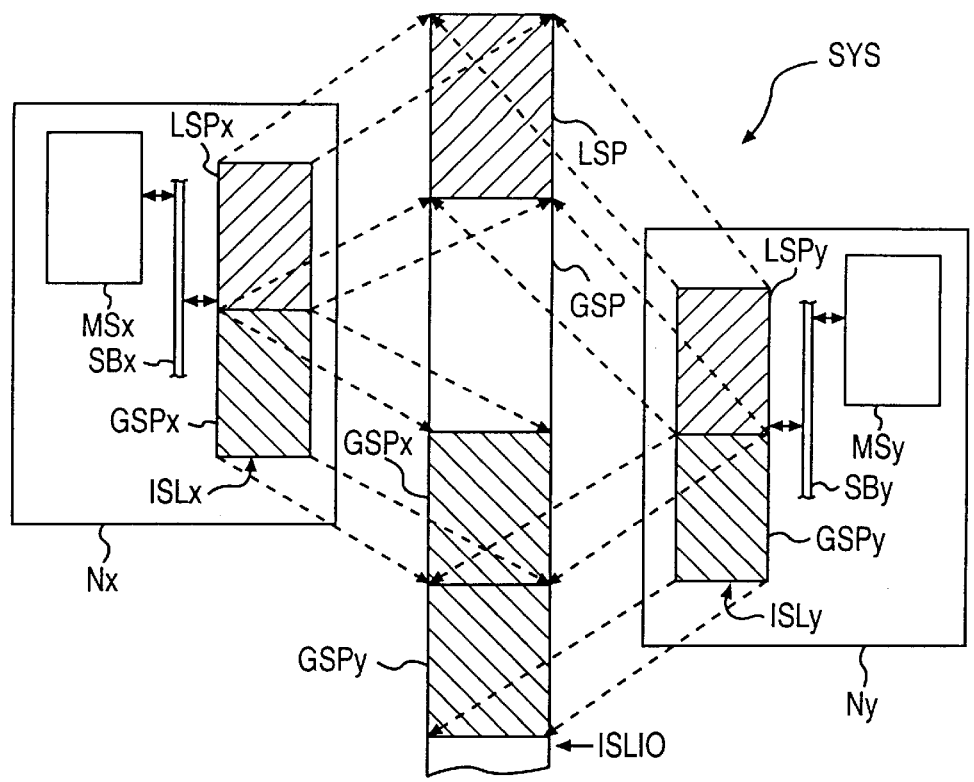
FIG. 4 is a schematic view of the structure of an address space of the system represented in FIG. 1.

FIG. 4 illustrates a characteristic of the system SYS which uses the processors indicated above. According to this characteristic, in the system SYS there are two types of address spaces, namely a memory space MS and an input-output space ISLIO. A memory space is the space normally formed by the memories, while the input-output space ISLIO is the address space available for the registers which contain all of the modules ISL. Two respective types of access, which reflect the two statuses of a request bit T in the system bus SB, correspond to these two spaces. It will be assumed that the request bit T=0 corresponds to an access in the memory space MS and that T=1 corresponds to an access in the space ISLIO. However, in order to facilitate understanding of the description, the requests transmitted by the system buses, which relate to the two respective spaces, have been given different names: Read/Write requests for the memory space and the programmed input-output requests PIO Load and PIO Store for the space ISLIO.

It has been seen that the address space ISLIO in a module ISL corresponds to an address space which is accessed by means of a reference which has a request bit T=1. The address capacity of this space is, for example, 4 gigabytes.

The space ISLIO is physically distributed among all the nodes. FIG. 4 also illustrates this distribution between the nodes Nx and Ny indicated in FIG. 1. Each node in this figure is schematically represented by its respective system bus SBx, SBy, its respective memory space MSx, MSy, and by the portion of the space ISLIO which is physically present in the respective modules ISLx, ISLy. The space ISLIO schematically and partially illustrated in FIG. 4 relates to the address spaces in the modules ISL and is divided into a local space LSP and a global space GSP. The local space LSP, which is hatched in FIG. 4, contains the registers which are only accessible by the node to which the module ISL belongs. The same register of the module ISL is accessed at the same address by the processors P of the node to which the register belongs, no matter which node it is. Therefore, a request to an address in the local space LSP is never transmitted through the links L. In short, the space LSP is a private space of the node. This is schematically illustrated in FIG. 4 by the fact that the transfers from the local spaces LSPx and LSPy to the space ISLIO, represented by broken lines, take place in the same local space LSP of the space ISLIO. The global space GSP, which is speckled in FIG. 4, contains registers which are addressable by all the nodes in the system SYS. The global space GSP is divided into a number of parts which are physically implanted in the modules ISL of the respective nodes. For example, as indicated by the broken lines in FIG. 4, the global spaces GSPx and GSPy of the space ISLIO are physically implanted in the respective modules ISLx and ISLy. Therefore, the global space GSP is an address space which is shared and physically distributed. For example, a bit field of the address can supply an identification of the node to which the register related to this address belongs.

In the example illustrated, the modules ISL comprise hardware resources which can be registers and banks of registers which execute functions of the first-in-first-out type, usually known as FIFO banks. The resources are accessed by the programmed input-output requests PIO (Programmed Input-Output). The registers used in the example illustrated have varying sizes whereas the FIFO banks used have a size of 16 bytes. In the example chosen, the length of the data transferred by each of these operations must correspond exactly to the length of the target register. The execution by a processor of the instructions LOAD and STORE is terminated when the processor receives a response from the system bus to the request PIO Load or PIO Store it has emitted. The response to a request PIO Load consists of data, while the response to a request PIO Store is formed of an acknowledgement. On the other hand, each module ISL can be commanded to change the status of an internal component of the module or to trigger specific actions in the module. In this case, the commands are in the form of operations PIO Load or PIO Store at specific addresses. Thus, for an operation PIO Store, for example, the address specifies the action to be taken while the data can parameterize the command.

Figure 5:
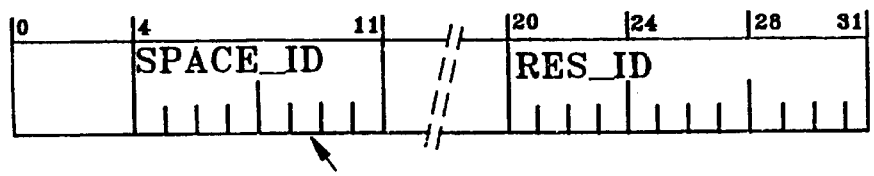
FIG. 5 is a schematic view of the structure of a programmed input-output address of a register used in the system represented in FIG. 1.

FIG. 5 illustrates an example of a PIO address, designated PIO Add, of a FIFO bank. The addresses of these registers are used as real addresses for the operations PIO Load and PIO Store. The address PIO Add illustrated has thirty-two bits and includes two essential parts: a space identification field SPACE_ID and a resource identification field RES_ID. The field SPACE_ID is made of most significant bits, here the eight bits 4:11, and it represents a coded identification in the space ISLIO, with the value 0 designating, for example, the local space LSP in the space ISLIO and with the values 1–8 identifying the global spaces GSP related to the respective nodes N1–N8. The resource identification field RES_ID is made of the least significant bits 20:31 and it supplies a coded identification of the resources desired by the operation (in this example, the resource is a FIFO bank). Moreover, if the bits 28:31 have the value 0000, the registers mapped in the space ISLIO have a size of 16 bytes.

The principal for decoding a PIO address is the following. If the space identification field SPACE_ID has the value 0, the register is in the local space LSP of the space ISLIO and the request is transmitted to a local module for executing programmed input-outputs LEXx, which is a hardware element located in the module ISLx of the node Nx in question and which is indicated in FIG. 1. If the space identification SPACE_ID corresponds to an identifier designated NODE_ID of the node Nx, the request is transmitted to a global module for executing programmed input-outputs GEXx, which is also a hardware element located in the module ISLx of the node Nx. Otherwise, the request must be executed in a remote node Ny by the module GEXy.

In each node in the system, a process is implemented which manages all the memories M and CM of the node. The management process chosen as an example uses the same well known consistency protocol for these memories. Generally, the process for managing exchanges between the memories of an information system consists of using the update mode or the invalidation mode for the copies of a memory block. If the invalidation mode is chosen, it is known, for example, to add to the address of each block two bits which represent the status of the block in the corresponding memory M, CM. Classically, four fundamental states of the consistency protocol for the memories are distinguished, which are currently standardized by the code MESI. In accordance with this protocol, in each node, the node Nx for example, the modified state "M" corresponds to the case in which a cache memory CMxm is the only holder of a modified copy of a block, called a reference copy, and in which there are no other valid copies in the system. In this case, the cache memory CMxm holding the copy which has the state "M" is responsible for supplying and updating the memory Mx if it wants to be free of this copy. A copy which has the exclusive state "E" is also the reference copy held by a cache memory CMxm, but in this case the main memory Mx has an updated copy of it. The shared state "S" relates to a copy which potentially has several holders, a copy of which is updated in the main memory Mx. The potential to be a holder depends on the management strategy adopted. Finally, the state of the copy is found to be invalid "I" when the cache memory CMxm has a copy of the block which is not valid. When a processor Pxm wants to access a block with the state "I", its cache memory CMxm sends a request through the system bus SBx to acquire the block. The other cache memories CMx and the memory Mx, through the system bus SBx, obtain knowledge of this request and react in accordance with the state of the copy which the corresponding memory possesses. Thus, if a cache memory CMx0 possesses the block in the modified state "M", it supplies the block to the system bus, thus making it possible for the requesting processor Pxm to access the data and for its cache memory CMxm to acquire the reference copy. There are still other optional states, both standardized and non-standardized, which are not described in the present application but which can be used by the data transfer process which will now be described.

2. Process for Transferring Data Between Nodes

Figure 6:
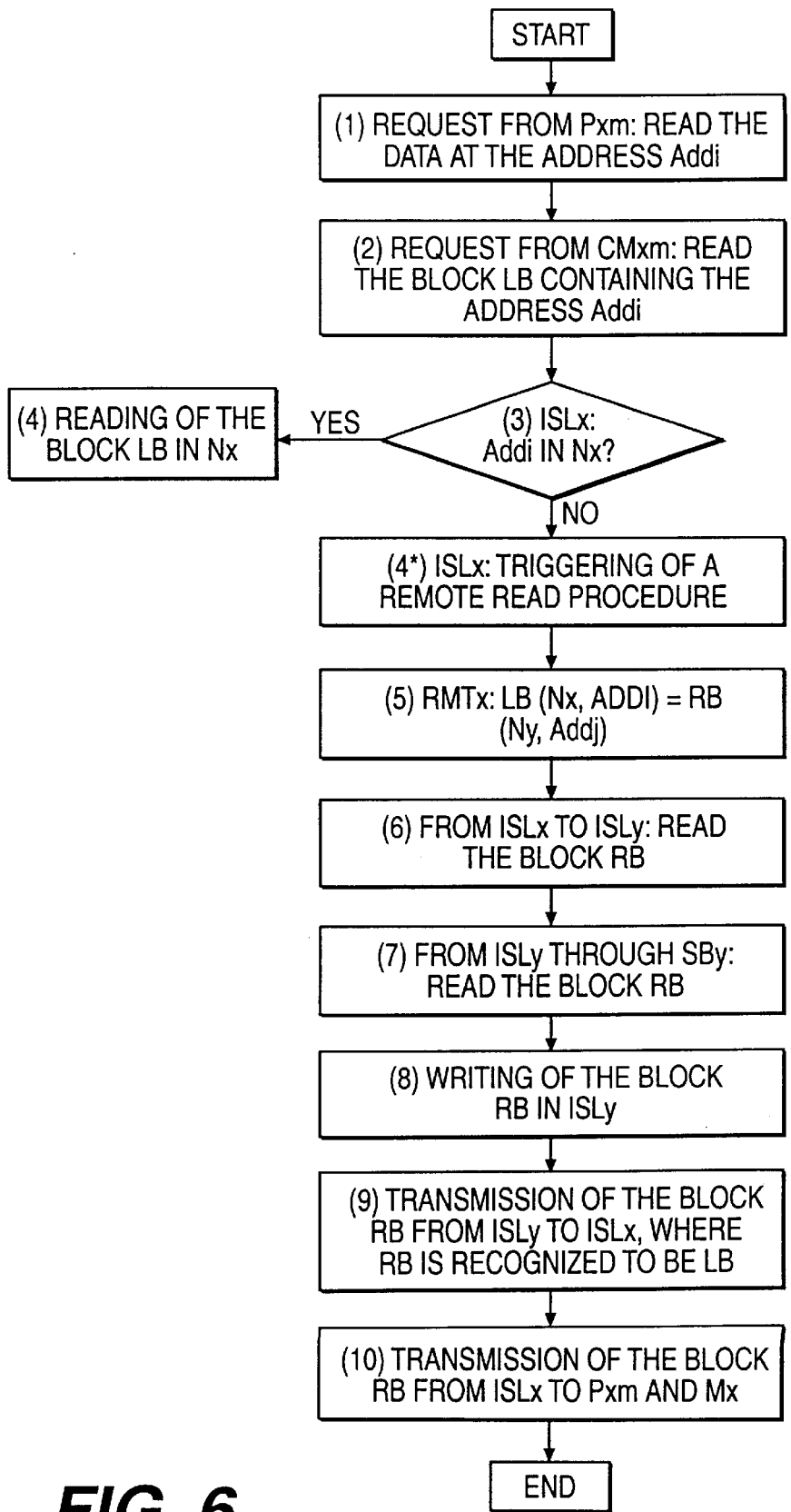
FIG. 6 is a flowchart which illustrates a form of implementation of the internodal data transfer process in the system represented in FIG. 1.

The process for transferring data between the nodes Nx and Ny of the system SYS will be described in reference to FIG. 1 and to the flowchart in FIG. 6. It is assumed in step (1)) of the flowchart that the processor Pxm wants to read the data having the address Addi and that its cache memory CMxm does not have the block which contains the data requested, which will be designated the local block LB. A copy of the local block LB is located in the memory Mx. In step (2) the cache memory CMxm emits a request through the system bus SBx in order to obtain a copy of the local block LB. In step (3) of the process, the module ISLx searches to find out whether it is responsible for supplying the valid copy of the block LB. If the result of the search is negative, this copy of the block is located in the memory Mx or in one of the cache memories CMx other than the cache memory CMxm and it is classically supplied, in step (4), to the cache memory CMxm by the memory Mx or CMx which holds the local block LB. If the result of the search is positive, the module ISLx must obtain this copy from another node in the system and then, in step (4*), trigger a procedure for remote reading of the desired block. In this case the module ISLx, along with the system bus SBx, behaves like a cache memory CM. The following example will assume that the internal interface of the module ISLx is behaving like a cache memory searching outside the node Nx for a block in the modified state. The internal interface ISLx/SBx is then engaged to supply the local block LB to the node Nx and, operating as though the block is in the modified state "M", it will supply it to the system bus SBx, which will allow the requesting processor Pxm to acquire the data at the address Addi and at the same time allow the memory Mx to be updated and the cache memory CMxm to acquire the complete block LB.

For step (5), the module ISLx contains a table of correspondence, here called a Remote Mapping Table RMTx, which allows it to know whether or not it is responsible for the valid copy at the address Addi and to read in the memories of the other nodes of the system. From this table, the module ISLx in step (5) will know that the address Addi of the local block LB sought corresponds to the remote block RB at the address Addj of another node Ny. In step (6) the module ISLx sends to the node Ny, by means of the link Lxy, a read request at the address Addj. In step (7), the module ISLy receives the request from the module ISLx and then, along with system bus SBy, behaves like a cache memory CMy which wants to read a block in the node Ny. Consequently, the module ISLy transmits to the system bus SB of the node Ny, through its interface ISLy/SBy, a request to read the block RB, and in response it receives, in step (8), the block RB held by one of the memories My, CMy which incorporates the data at the address Addj. In step (9), the module ISLy transmits the remote block RB, in the form of a packet BLOCK, to the module ISLx of the node Nx, which recognizes the remote block RB to be the requested local block LB which contains the address Addi. Then, in step (10), since the local block LB is considered to have the modified state "M", the module ISLx, through the system bus SBx, supplies the local block LB simultaneously to the memory Mx and the cache memory CMxm, which extracts from it the data at the address Addi in order to supply them to the processor Pxm. This terminates the process according to the invention for managing data in the system SYS.

This process has the advantage of being both simple and fast. It is simple in that it uses both a standard state of the protocol for managing the memories used by the nodes in the system, and a standard behavior of the memories in response to this state. The solution adopted does not complicate the hardware or the software. It is fast because, although the data requested by a processor of a node are supplied to it by a memory of another node, it obtains them using substantially the same procedures which would be used if they came from a memory in the same node.

The implementation of this example of the process assumes that a correspondence has been established between each node. There are several possible ways to establish a correspondence in a node which allows the node to read in the other nodes. The following example of the establishment of the table of correspondence RMT in each module ISL makes use of the above-mentioned characteristic of the processors used in the example of embodiment of the system. In reference to the text above, it is understood that the tables of correspondence RMT are accessible in the local space LSP of the space ISLIO. In order to establish the correspondence between the addresses Addi and Addj, it is necessary to write in the local space LSP at an address which corresponds to an entry in the table RMT. A reading at this address returns the status of the transfer in progress, which is updated by the module ISL after each operation on a block executed by the module. This reading operation makes it possible to ensure that a data transfer sequence is carried out without a fault.

The contents of the table of correspondence RMT and its use in step (5) of the process will now be described. In the example illustrated, each table of correspondence RMT constitutes an associative memory formed of sixteen registers in the local address space LSP of the space ISLIO. The registers are managed by software and have a size of sixteen bytes. Each register defines an entry IN-RMT in the table.

Figure 7:
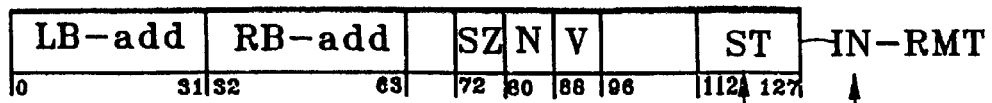
FIG. 7 is a schematic view of the structure of an entry in a table of correspondence used in the data transfer process represented in FIG. 6.

FIG. 7 illustrates an example of the format of an entry IN-RMT in a table RMT. It is formed of 128 bits distributed as follows:

LB-add is a field formed of the bits 0:31, which represents the real address of the local data block LB.

RB-add is a field formed of the bits 23:63, which represents the real address of the remote data block RB.

SZ is a field formed of the bits 72:79, which represents the size of the block. The following table provides an example of this field.

| length of the block | size of the field SZ |
|---|---|
| 64 bytes | 00000001 |
| 128 bytes | 00000011 |
| 256 bytes | 00000111 |
| 512 bytes | 00001111 |
| 1 kilobyte | 00011111 |
| 2 kilobytes | 00111111 |
| 4 kilobytes | 01111111 |

In this table, the six least significant bits of the seven bits of the block SZ define a mask MSK, the use of which will be described later in reference to FIG. 3.

N is a field of eight bits 80:87 which designates the remote node.

V, in a field of eight bits 88:95 is the least significant bit (95) which indicates whether the entry IN-RMT is involved in a remote address.

finally, ST is a status field formed of sixteen bits 112–127 and it represents a coded error. In a case in which an error occurs during a remote reading sequence, it is recorded in a code by the module ISL in the field ST of the entry IN-RMT.

FIG. 3 schematically illustrates the use of an entry in the table RMT in an example of the implementation of a remote reading operation. This is an operation through which a processor Pxm, which executes an instruction triggering a read request in the bus SBx for a mapped local block LB, obtains read access to a remote memory zone. This operation comprises the detection of a mapped address and the processing of a read transaction in the bus. In order to detect a mapped address, the module ISLx detects and captures ("snoops") the read requests executed in the system bus SBx and analyzes them. It is assumed that the address Add of each request is the same address described previously in reference to FIG. 3. This figure also represents a real address LB-add of a local block LB of a valid entry in the table RMTx. The process, the principal of which is well known to one skilled in the art, consists of comparing the address Add of each request detected and analyzed by the module ISLx with the field LB-add of all the valid entries in the table RMTx, which in this case is used as an associative memory. This comparison is made in reference to the mask MSK defined by the six least significant bits of the field SZ of an entry IN-RMT, as described above in reference to FIG. 7. This comparison makes it possible to find the local block LB sought and it is expressed by the relation Add ∩ MSK=LB-add. In fact, the boundary between the string of "0"s and the string of "1"s in the mask MSK determines the displacement D1 of the data zone Z and the displacement D2 of the block within the zone. By consulting the table RMTx, the real address RB-add of the corresponding remote block RB is obtained. The relation (Add ∩ MSK) ∪ RB-add determines the displacement D of the address Add' which will be sent by the module ISLx through the link Lxy. Then the displacement D' is added in order to obtain the real address Add' of the remote read request through the bus.

Figure 8:
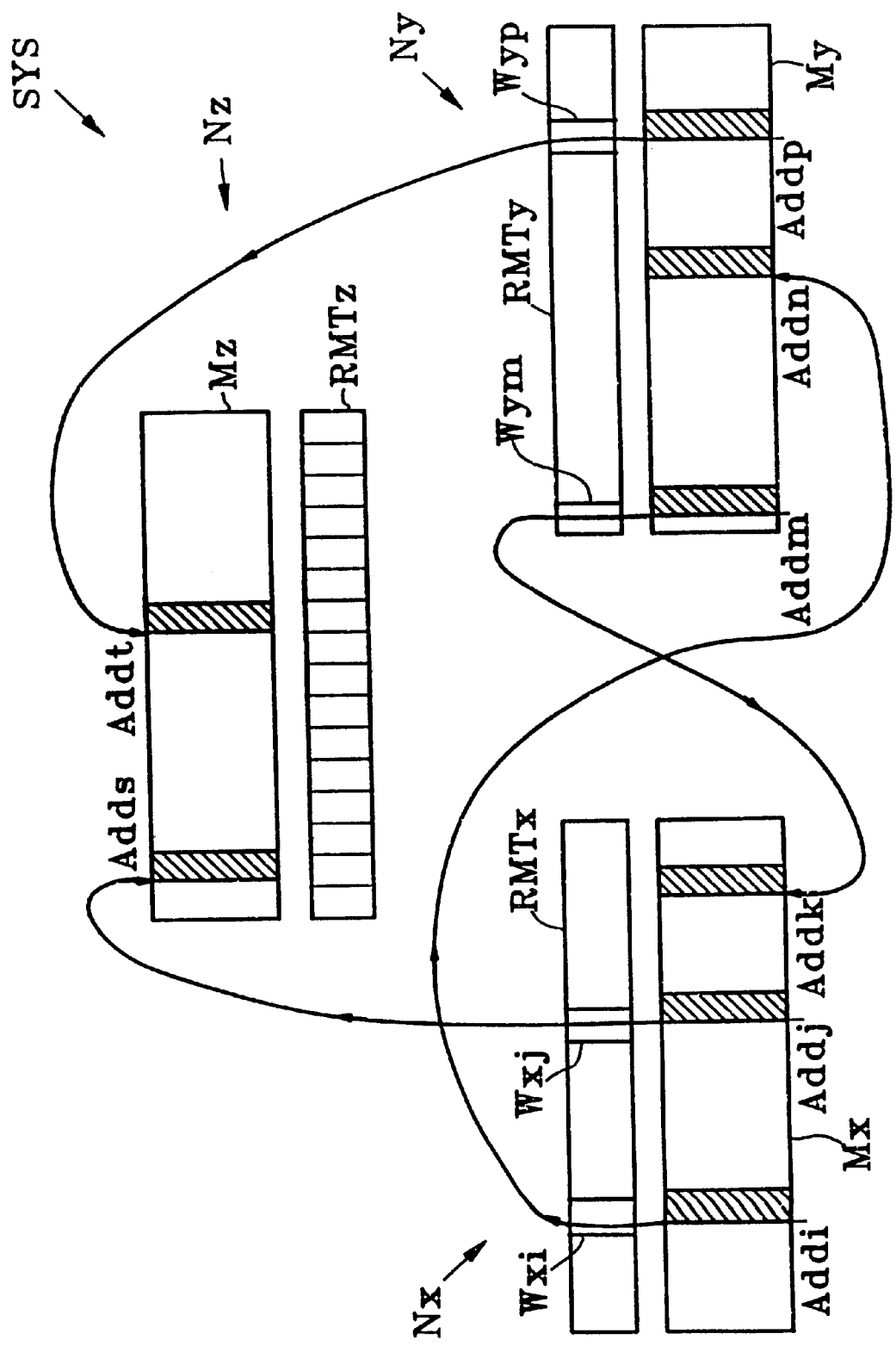
FIG. 8 is a schematic view of a structure of the memories and tables of correspondence of three respective nodes, which illustrates a form of implementation of a step in the data transfer process represented in FIG. 6.

The use of the process in a system composed of several nodes will now be described. FIG. 8 schematically represents a system SYS composed of three nodes Nx, Ny and Nz in which only the respective memories Mx, My, Mz and the respective tables RMTx, RMTy and RMTz are illustrated. The continuous address zone of a local memory, which is mapped by each register with a continuous address zone in a remote memory, will be called a window W. Since in the example illustrated a table RMT comprises sixteen registers, it makes it possible to open sixteen windows. This designation reflects the visibility which a table RMTx of a node Nx provides of the contents of the memories of the other nodes in the system SYS. In the example in FIG. 8, it is assumed that a processor Pxm of the node Nx is requesting data with an address Addi which its cache memory CMx must search for in the memory Mx. It is also assumed that the address Addi belongs to a window Wxi. As indicated by a curved line between the nodes marked with arrows, the node Nx sees through the window Wxi of the table RMTx that the data with the address Addi are located at the address Addn in the memory My of the node Ny. Likewise, if later the processor Pxm or another processor Px0 requests data at another address Addj in the memory Mx, and if the address Addj belongs to a window Wxj, the node Nx will see through the window Wxj of the table RMTx that these data are located at the address Adds in the memory Mz of the node Nz. Conversely, at an address Addm in the memory My, the node Ny sees through a window Wym of the table RMTy that the data are located in the memory Mx of the node Nx at the address Addk, and at an address Addp of the memory My, the address Addt in the memory Mz will be seen through a window Wyp. The same reasoning can generally be applied to all the nodes in the multinode system SYS. Generally, it may be deduced that any data area DA in the memory M of a node N can be seen by one, some, or all of the other nodes in the system through their respective tables RMT, either simultaneously or successively.

It has been seen that several windows can be open at the same time. Thus, in a multiprocessor node, several data areas can be transferred in parallel. This makes it possible to multiply the data transfer rate by the number which represents the degree of parallelism (the number of parallel transfers) and it constitutes an important advantage. Furthermore, at the same time that the processors of a node are executing transfers from remote memories, the memory of this node can be accessed as a remote memory for the other nodes. In other words, this process makes it possible to execute simultaneous bidirectional transfers, and it therefore offers an additional advantage which is also very important.

In this context, several solutions are possible for managing the opening and closing of the windows of each table. The example of a solution which follows will allow the other solutions to be deduced.

As indicated in FIG. 7, two addresses XW and XR of the local space LSP of the space ISLIO are associated with each entry IN-RMT of a table RMT. A window W is opened by a mapping operation MAP and closed by an unmapping operation UNMAP. The operations MAP and UNMAP are respectively translated in the system bus by write requests PIO Store and read requests PIO Load at the address XW. The request PIO Store updates the entry IN-RMT of the table and thus establishes the correspondence between an address in the local memory and an address in a memory of a remote node. The request PIO Load returns the contents of the entry IN-RMT and invalidates the correspondence, for example by lowering the corresponding bit V in the field of this entry.

When the operation MAP has been executed by the module ISLx, a window W is opened and all the read requests for a local block LB, the addresses of which are contained in the window, are translated thanks to the correspondence established by the entry IN-RMT and are sent to the remote node Ny. When the operation UNMAP has been executed by the module ISLx, the window W is closed and the read requests whose addresses were contained in the window are executed normally by the local memory Mx.

Another solution, for example, would be to leave a window open permanently and to execute successive transfers. After each of these transfers, an operation GET-STATUS of the read request PIO Load at the address XR returns the contents of the field ST of the entry IN-RMT, without invalidating this entry.

It must also be noted that the same remote address can be mapped with different addresses in the local memory of the same node or of different nodes. On the other hand, to avoid having to manage cases of multiple errors, an address in a different remote memory must not be mapped with the same address in a local memory and two valid IN-RMT entries must not map address domains which overlap one another.

This data transfer process offers still other advantages over those indicated previously. In particular, it makes it possible to have low latency in the transmission of short messages and, consequently, a high throughput for these messages. On the other hand, it gives the receiving node the power to control the flow rate of the data transmission. Consequently, the receiver can temporarily interrupt a transfer in progress without any loss of data and without disturbing the operation of the emitter. Moreover, since the flow is controlled continuously by the receiving node, intermediate data storage is not necessary. Moreover, it is the receiving node which designates the address at which the data are stored in memory. If it makes an error in addressing the data to be read in the emitting node, the reading of these data at an erroneous address does not alter these data. The transfer process just described therefore ensures good internodal protection of the data.

The description of the internodal data transfer process makes it clear that one skilled in the art could contribute numerous variants to it. It has been seen that it is well suited to the transfer of data between multiprocessor nodes. It has also been seen that it is well suited to a system in which each of the nodes has its own operating system. More generally, however, all of the nodes, some of them or none of them could share the same operating system. For example, two of the nodes could be managed by the same operating system. On the other hand, some nodes may not have the same operating system. Moreover, the process described and illustrated applies the MESI type consistency protocol for the memories of each node. However, it is clear that it uses only the mechanism related to the modified state "M" of this type of protocol. If other protocols were used in one, some or all of the nodes, the process could simply use a mechanism analogous to that described for the internodal data transfer. This protocol involves the presence of cache memories, as illustrated. However, the processors could have a larger hierarchy of cache memories.

Generally, the invention relates to a process for the transfer of data between nodes in an information system, in which each node Nx comprises at least one processor Pxm provided with a cache memory CMxm, a memory Mx, a system bus SBx and a module ISLx for communication with another node Ny, wherein the management of the data in each node is carried out in accordance with a consistency protocol MESI for the memories in the node. One characteristic of this process is to use a mechanism of this protocol for the transfer of the data from a first node Nx to a second node Ny.

In the example illustrated, it has been seen that the mechanism corresponds to the modified state of the MESI type consistency protocol. More precisely, the mechanism with this state which is sufficient for the transfer process consists of using the internal interface of the module ISLx with the system bus SBx as though the interface were that of a cache memory CMx possessing the only updated copy in this node of a data block LB of this node and supplying it in response to a request from a cache memory CMxm of this node.

The method used as an example of execution for the utilization of this mechanism to implement the transfer process consists of transforming this request into a request related to the second node Ny, transferring it from the first node to the second node Ny in order to acquire a copy of a data block RB of the second node, transferring this copy of the data block RB of the second node Ny to the first node Nx, and presenting it as the only updated copy requested by the module of the first node Nx.

In the example illustrated, this method of operation uses, in the second node, the internal interface of the module ISLy with the system bus SBy as though it were that of a cache memory CMy which wanted to acquire a copy in this node of a data block RB of this node. A non-illustrated variant would consist of, for example, acquiring a copy of the second node Ny by directly accessing the memory My of this node. This type of access is ordinarily known by the abbreviation DMA (Direct Memory Access).

It has also been seen that the method of using the above-mentioned mechanism of the protocol MESI can have the advantage of benefitting from a specific characteristic of the processors used as examples, by using, in the first node Nx, a table of correspondence RMTx for recognizing and transforming this request into a request related to the second node Ny. According to a first mode of application which was illustrated in reference to FIG. 8, each entry in the table defines a window of correspondence between a continuous address part of the memories of the first node Nx, and a continuous address part of the memories of another node, and the recognition of the request occurs through the address of the request. In this case, a choice was made to write the contents related to each entry in the table using the operation MAP, in order to open the window and thereby establish the correspondence between these requests. A choice was also made to read the contents related to each entry in the table using the operation UNMAP, in order to close the window and thereby invalidate this correspondence. However, it is clearly possible not to add either of these choices, or to use only one of them, while other choices are also available to one skilled in the art. According to a second mode of application which was also described above, the window is open permanently, so that successive transfers can be executed at the same addresses.

It has also been seen that if the transfer of the request or the copy results in a fault, the process consists of writing the type of the fault into the contents of the entry IN-RMT in the table RMT which corresponds to this request and making these contents read-accessible by the operation UNMAP or GET-STATUS.

A corollary result is an information system SYS comprising processors Pxm, Pyn provided with respective cache memories and distributed in at least two nodes Nx, Ny comprising a memory M, a system bus SB and a communication module ISL which implements the process defined above.

In particular, it will be noted that in the example of embodiment illustrated, the table of correspondence is contained in the input-output address space ISLIO related to the registers which contain the modules of the nodes. According to a possible variant, it could be contained in the memory address space MS in FIG. 4. Likewise, although the table of correspondence illustrated is accessible in a local space LSP of the input-output address space ISLIO, it could also be accessible in the global space GSP.

3. Process for Transferring Messages Between Nodes.

Figures 9, 10:
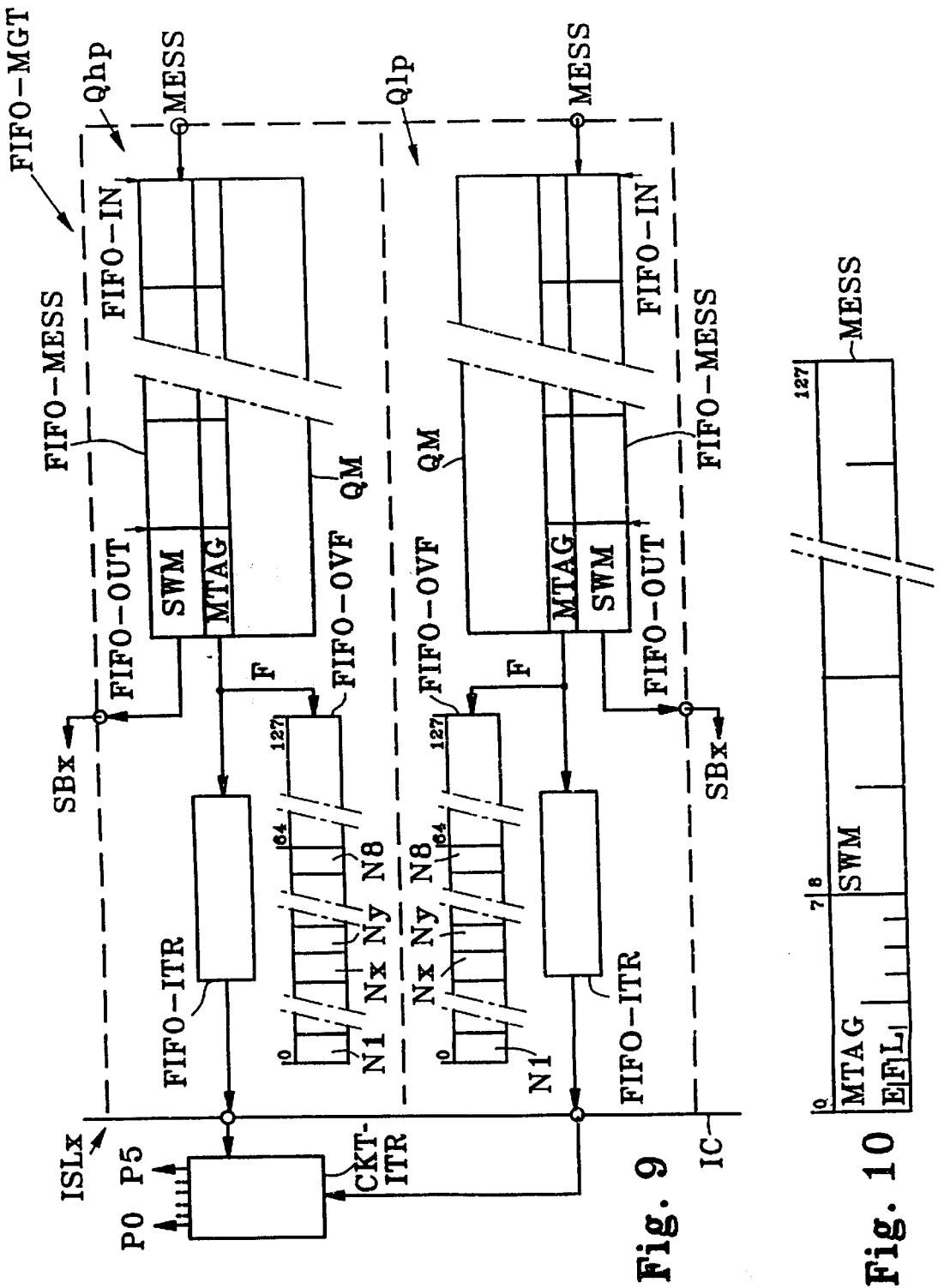
FIG. 9 is a partial schematic view of the structure of a communication module included in each node of the system represented in FIG. 1, and it illustrates a circuit related to two message queues used by the message transfer process described in reference to FIG. 11.
FIG. 10 is a schematic view of the structure of a message used in the system represented in FIG. 1 and by the message transfer process described in reference to FIG. 11.

In the example of the system SYS represented in FIG. 1, it has been seen that the nodes can communicate with one another by means of messages MESS. FIG. 1 represents, in the form of a block diagram, and FIG. 9 schematically illustrates a part of the module ISLx, called FIFO-MGT, which is used to implement a process for transferring messages between the nodes of the system SYS. This process involves the idea of a message queue in each node, in this case in each module ISL of the node. In the example of the system SYS chosen, any module ISL of any node N comprises two queues in its part FIFO-MGT, as illustrated in FIG. 9: a high-priority queue Qhp for receiving priority messages, and a low-priority queue Qlp for receiving other messages. More generally, there can be one queue or several queues which will generate interruptions at different levels, which levels can correspond to degrees of priority as in the present example. From the hardware point of view, each queue comprises a bank of registers FIFO-MESS for storing the messages and a device QM for managing the queue. Each bank FIFO-MESS in this case is made of thirty-two cells. A cell is an internal register of sixteen bytes used to store a message MESS. Due to the utilization in the hardware of a structure with registers of limited size, this message transfer process is used for messages MESS of predetermined size. From the software point of view, each bank FIFO-MESS has two well known addresses in the address space ISLIO. The first address, designated FIFO-IN, situated in the global space GSP of the corresponding node, is used for executing write operations in the queue. The second address, designated FIFO-OUT, which is located in the local space LSP of the space ISLIO, is used for executing read operations in the queue. Each queue is also a source of interruptions in the operation of the processors of the host node and controls an interruption register FIFO-ITR. The interruption register FIFO-ITR has an input which issues from the message queue and an output which is supplied to an output of the module ISLx, where it is linked to an input of a circuit CKT-ITR for managing interruptions in the corresponding node. This circuit receives all the interruptions and manages them according to their priority and the level of interruption allowed by the designated processor. Therefore, this circuit has an output to a designated processor of the node or outputs to all or some of the processors P0–P5 of the node. The structure and the operation of an interruption management circuit of this type are well known to one skilled in the art. In a simplified version, the output from the register FIFO-ITR can be sent directly to a processor. Moreover, each message queue controls, in the module ISLx, the input of an overflow register FIFO-OVF which indicates the identity of the node or nodes which attempted to write while the queue was full. The operation of a message queue will now be described.

According to an example of the implementation of the process, any message is transmitted to a node by being placed in a message queue of this node through an operation ENQUEUE, whereas a message is read from a queue by being retrieved from the queue through the operation DEQUEUE. The enqueuing operations ENQUEUE involve the write operations PIO Store, while the dequeuing operations DEQUEUE involve the read operations PIO Load. In the example which will be described, the operations DEQUEUE are executed only by the node to which the queue belongs. The address attached to the queue for the enqueuing operations is FIFO-IN and the address for the dequeuing operations is FIFO-OUT. Any node can send a message to another node in the system or to itself. In other words, all the nodes can write in a queue related to a node, but only that node can read the queue. The enqueuing and dequeuing operations are serialized. They conclude with the return of a response which flows through the system bus. The response to the data associated with the operation PIO Load is a message, whereas the response to the operation PIO Store is an acknowledgement (positive or negative). The write and read operations are not inhibiting. A response is always given to each of them, so that there are no deadlocks, for example as in a wait for a message in the queue when the queue is empty.

FIG. 10 schematically represents an example of the format of a message MESS. The messages all have the same fixed size, in this case sixteen bytes. The message MESS obtained in response to a dequeuing operation DEQUEUE contains a field MTAG of indicators for the hardware and a field SWM intended for the software. The field SWM is usable by the software of a node in order to be transmitted to the software of another node. In the example illustrated, the field MTAG is formed of one of the sixteen bytes comprising the bits 0:7, whereas the field SWM is formed of the other fifteen bytes comprising the bits 8:127. More precisely, the field MTAG includes a string of queue status bits which constitute indicators. The field specifically contains three indicators E, F and L which occupy the bits numbered 0, 1 and 2 in the field represented. The indicator E is an indicator of the validity of the message read in the queue. A read operation DEQUEUE on a queue which has no message must not inhibit the operation of the module ISL. The indicator bit E performs this role by being set, for example, at the status 1 so as to indicate that the field SWM of the message is undefined as a result of the execution of the operation PIO Load triggered by the operation DEQUEUE. The bit F is an indicator that the queue is full. When an operation PIO Store is triggered in a module ISLx during an operation ENQUEUE for introducing a message into the queue of another module ISLy and when the message cannot be written because the queue is saturated, the module ISLx which emitted the operation PIO Store is notified of this event by a negative acknowledgement. At the next dequeuing operation DEQUEUE by the read operation PIO Load related to this queue in the module ISLy, this module changes the status of the bit F, setting it at 1 for example, so as to indicate both that the occupation of the queue is saturated and that a write operation PIO Store has been unsuccessfully attempted in this queue. The bit L designates the last and only valid message in the queue. During the execution of a read operation PIO Load for executing the operation DEQUEUE, the bit L changes its status, so as to be set at 1 for example, in order to indicate that it is actually the last valid message in the queue. The module ISLy then generates an interruption at the next write operation PIO Store as a result of the operation ENQUEUE on this queue. As a general rule, in order to minimize the number of interruptions, every interruption is triggered each time a write operation is executed in a queue which was previously empty, whereas no interruption is produced when the queue already contains at least one message. In response to a write operation PIO Store in a queue, the field MTAG of the message is ignored by the module ISLy which has the queue.

Figure 11:
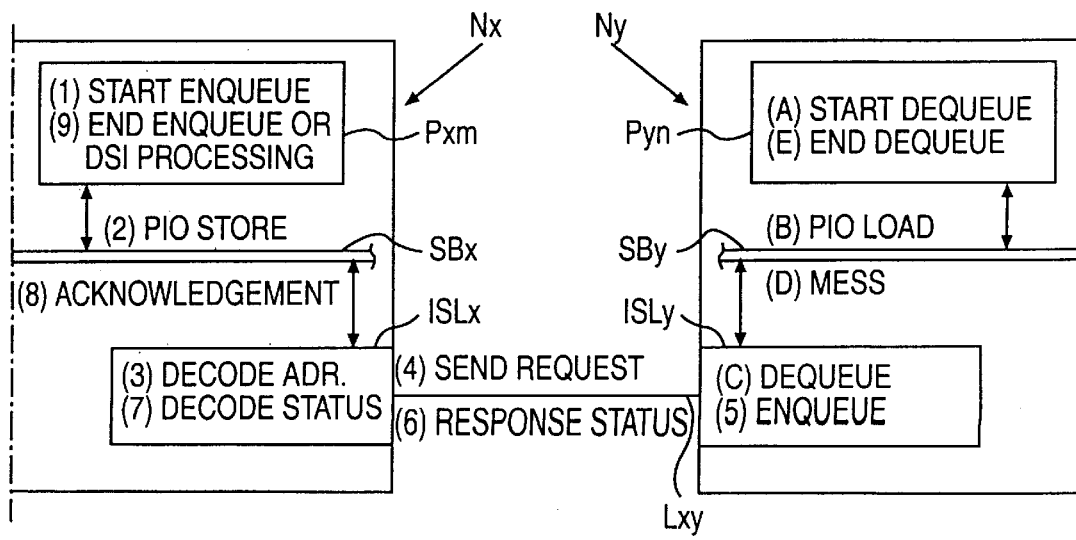
FIG. 11 is a partial schematic view of the structure of two nodes in the system represented in FIG. 1, which indicates the steps in a message transfer process.
Figure 12:
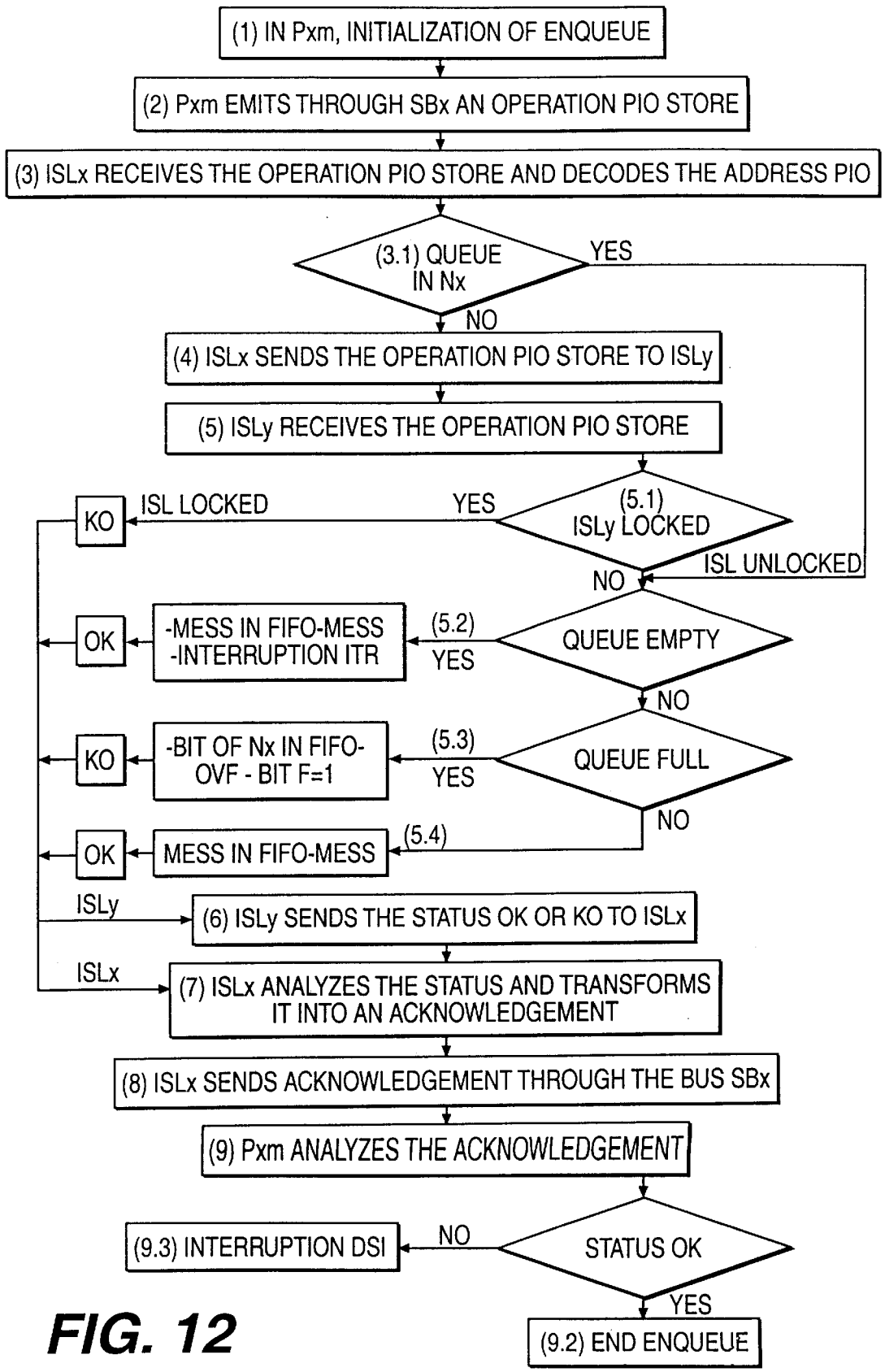
FIGS. 12 and 13 are flowcharts which respectively illustrate the steps in the execution of a macroinstruction for enqueuing the message represented in FIG. 10, and a macroinstruction for dequeuing the message, for implementing the message transfer process represented in FIG. 11.

FIG. 11 will be used to illustrate the description of a programming model related to the placement of messages in a queue and the retrieval of messages from a queue. The flowchart in FIG. 12 represents a message enqueuing algorithm consisting of the following steps, the sequence numbers of which are indicated in FIG. 11 at the places where they occur, with a brief indication of their function.

(1) A processor Pxm of the node Nx must send a message to a node Ny. A enqueuing macroinstruction ENQUEUE is initialized (the operation "start ENQUEUE" in FIG. 11), which involves three parameters: the message MESS to be sent, a queue identifier QUEUE_ID and the identifier of the receiving node NODE_ID.

(2) The enqueuing macroinstruction generates a write instruction STORE. The processor Pxm executing this instruction supplies the bus with a write operation PIO Store, which is processed by the module ISLx.

(3) The module ISLx decodes the address PIO (the operation "decode adr." in FIG. 11) and searches, in step (3.1), to see whether or not the address is located in the node Nx. If the queue is local, nothing is sent through the link Lxy and the module ISLx will attempt to place it in the designated queue Qhp or Qlp. The macroinstruction ENQUEUE then continues with step (5.2) below. If, on the other hand, the queue is located in a remote node Ny, the macroinstruction continues as follows.

(4) The module ISLx sends the write operation PIO Store to the remote module ISLy of the node Ny through the link Lxy (the operation "send request" in FIG. 11).

(5) When the module ISLy receives the write operation PIO Store, several things can occur (grouped under the operation "queue" in FIG. 11).

(5.1) The module ISLy verifies whether or not the queue is locked. If it has a locked status ISL_Locked, it generates an internal status KO which represents an unfulfilled request and sends it to the module ISLx. If not, the module ISLy has an unlocked status ISL_Unlocked and it attempts to write the message in the following way. This method is also the method used by the module ISLy to write a message MESS emitted by a processor of the node Ny. Three things can occur:

(5.2) If the queue is empty, the module ISLy:

places the message MESS into the bank FIFO-MESS of the queue designated Qhp or Qlp, sends an interruption ITR to the node Ny to indicate the presence of a message to be processed, and generates an internal status OK indicating a correct response.

(5.3) If the queue specified is not empty, the module ISLy verifies whether, on the contrary, it is full. If so, the module:

places the bit which corresponds to the emitting node Nx in the overflow register FIFO-OVF of the queue, changes the status, for example setting it at 1, of the indicator bit F of the field MTAG of the first message in the queue, and generates a status KO indicating that the request has not been fulfilled.

(5.4) If the queue is neither empty nor full, the module ISLy:

places the message in the bank FIFO-MESS of the queue, and generates a status OK indicating a fulfilled request.

Consequently in this case, no interruption ITR is emitted in the node Ny.

(6) In response, the module ISLy sends the status it generated previously (OK or KO) to the module ISLx through the link Lxy (the operation "response status" in FIG. 11).

(7) The module ISLx analyzes the status of the response from the module ISLy or from its own module if the queue is located there (the operation "decode status" in FIG. 11) and transforms it into a positive or negative acknowledgement for the operation PIO Store in question.

(8) The module ISLx sends the positive or negative acknowledgement through the system bus SBx to the processor Pxm which emitted the initial operation PIO Store (the operation "acknowledgement" in FIG. 11).

(9) In step (9), the processor Pxm receives the acknowledgement and in step (9.1) verifies whether it is positive or negative. If it is positive, in step (9.2), it terminates the macroinstruction ENQUEUE, erases the write operation PIO Store and continues to process the following operations. If it is negative, the request has not been fulfilled and will be processed later in an error recovery processes. Briefly, since it is known, this process triggers an interruption related to the data storage DSI belonging to processors of the PowerPC type (step 9.3 in FIG. 12 and the operation "end ENQUEUE or DSI processing" in FIG. 11). If the processor or the system does not have the capacity to execute an automatic error control after receiving a negative acknowledgement, one solution among others consists of generating an acknowledgement which is always positive and storing the negative acknowledgement status in a specific register of the module ISLx, which status will be read later by an operation PIO Load on this register.

Figure 13:
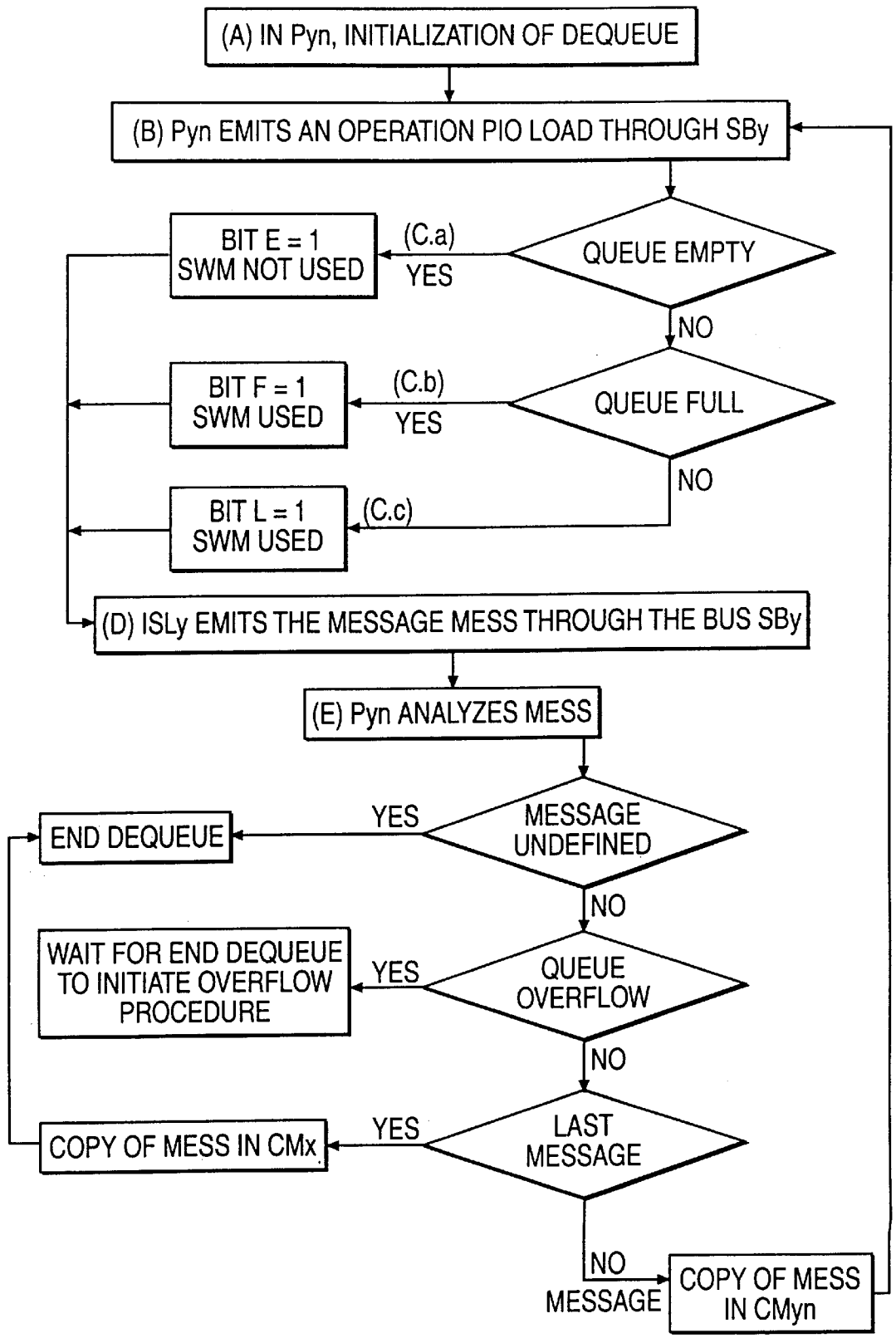

An example of the process for dequeuing and processing a message from a queue of the node Ny is described in reference to FIGS. 11 and 13.

(A) A processor Pyn is designated by the interruption management circuit CKT-ITR for initializing a dequeuing macroinstruction DEQUEUE (the operation "start DEQUEUE" in FIG. 11) which includes the queue identifier QUEUE_ID as a parameter.

(B) The macroinstruction DEQUEUE begins with a read instruction LOAD. The processor Pyn executing this instruction emits, through the bus SBy, a read operation PIO Load which is received and processed by the module ISLy of the node Ny.

(C) The module reads the first message in the queue. The process chosen as an example always performs a reading of the sixteen bytes of the message MESS at the address FIFO-OUT in the bank FIFO-MESS and supplies the field MTAG which represents the status of the queue. Several things can occur, which are included in the operation "dequeue" in FIG. 11.

(a) If the queue is empty, that is if the bank FIFO-MESS has contents which do not represent a message MESS, the indicator bit E of the field MTAG changes its status, taking for example the value 1, and the other indicator bits remain at the level 0, which signifies that the contents of the first register in the bank FIFO-MESS have no direction. In practice, the sixteen bytes of the message MESS of the queue are read, in which the field MTAG constituting the first byte indicates that the queue is in fact empty and that consequently the fifteen bytes SWM of the message MESS are undefined and are not usable by the software.

(b) If the queue is full and at least one failure to enqueue a message has occurred, the bit F of the field MTAG of the first message of the queue has changed its status and is set, for example, at the level 1 while the other bits in the field remain at the level 0, so that the fifteen bytes SWM of the message MESS will be dequeued and used by the software, which is also informed of the overflow.

(c) If the queue is neither empty nor full (the normal condition) the message MESS is read and the fifteen bytes SWM will be used by the software. All the bits of the field MTAG are at the level 0, unless the message is the last one in the queue (in which case the bit L=1 and the other bits remain at 0).

In summary, the field MTAG in the example chosen must have one of the following four configurations, and any other configuration denotes the abnormal operation of the module ISL:

| E | F | L | |
|---|---|---|---|
| 0 | 0 | 0 | normal reading of the queue: normal message |
| 0 | 0 | 1 | last message. |
| 0 | 1 | 0 | normal message, but the queue is overflowing |
| 1 | 0 | 0 | undefined message. |

(D) The module ISLy sends, through the system bus SBy, an acknowledgement of the operation PIO load in the form of the data of the message MESS, which has sixteen bytes in the example chosen (the operation "MESS" in FIG. 11).

(E) The processor Pyn receives the acknowledgement and acquires the contents of the message, from which it analyzes the contents of the field MTAG. If the message is undefined, the queue was empty and the operation DEQUEUE is terminated, If it is the last message waiting in the queue, the processor can process it or store it and the operation DEQUEUE is terminated. If the queue is overflowing, an overflow processing macroinstruction could be initiated when the operation DEQUEUE is terminated. The processor Pyn can then process the valid message which issues from the preceding tests, or store it in its cache memory CMyn, and it reads the next message by returning to step (B). Step (E) constitutes the operation "end DEQUEUE" in FIG. 11.

The hardware part used to implement the two macroinstructions ENQUEUE and DEQUEUE, which are schematically represented in FIG. 9, will now be described in greater detail as an illustrative example of implementation.

FIG. 9 also illustrates an example of the format of the overflow register FIFO-OVF. The register FIFO-OVF is mapped in the local space LSP of the address space ISLIO. In a queue, this register is associated with the bank FIFO-MESS and it is located in the module ISL which incorporates this queue. An identification bit is assigned to each node in the system. As indicated in FIG. 9, the register FIFO-OVF has a length of sixteen bytes, so that the system can have a maximum of 128 nodes. Thus, when a message MESS emanating from an node Nx finds that the bank FIFO-MESS is full, the receiving module ISLy raises the identification bit of the emitting node Nx in the register FIFO-OVF to 1. The contents of the register FIFO-OVF therefore represent the nodes in which the respective messages have been refused since the last reading of the register FIFO-MESS.

When a node Ny reads in a message queue MESS in which the bit F indicates an overflow, it can refer to the register FIFO-OVF to find out which emitting nodes have experienced a write failure in the queue due to a saturation. When the queue is no longer full, the receiving node Ny could then send them a message indicating a change in the status of the register FIFO-MESS, so that the emitting nodes could each return their messages MESS. The operation PIO Load at the address of the register FIFO-OVF is an operation for reading and clearing the contents of this register to zero.

The interruption register FIFO-ITR is mapped in the local space LSP of the space ISLIO. A write operation PIO Store at the address of the register clears the interruption source to zero, no matter what the value of the data.

The description of the example of the internodal message transfer process makes it clear that one skilled in the art could contribute numerous variants to it. The nodes can have any number of processors, and can even have different numbers of processors. Likewise, even though each of the nodes described has its own operating system, all the nodes, some of them or none of them could share the same operating system. Moreover, the processors could be without respective cache memories, or could have a larger hierarchy than that described. On the other hand, some nodes could be without an input-output subsystem IOS.

Generally, therefore, it may be said that the subject of the invention is a process for transmitting a message MESS in an information system SYS comprising processors Pxm, Pyn distributed in at least a first node Nx and a second node Ny, each of which has a module ISL for communication with another node by means of a transmission link Lxy. The message, which has a predetermined size, is emitted by a processor Pxm of the first node Nx in the form of a write operation PIO Store in the communication module ISLx of the first node and is transmitted, by means of the communication link Lxy, to the communication module ISLy of the second node in which it is stored in a queue of messages received Qhp, Qlp, in the order of its reception. A processor of the node Ny incorporating the queue retrieves the message from the queue in the form of a read operation PIO Load in the communication module ISLy of this node so that the information SWM contained in the message can be processed, which queuing and dequeuing operations are carried out sequentially.

The transfer of the messages is controlled by the write operation PIO store and the read operation PIO Load. The result is a simple, rapid transfer. Their reception in a queue and the successive read and write operations ensure the protection of the information contained in each transferred message. And the enqueuing of these messages in the order of their reception ensures the sequencing of the messages.

It has been seen that the message emitted by the processor Pxm of the first node can be intended for that node, where it is stored in the queue of messages received in the order of its reception, and retrieved in the same way as before, by the processor Pxm or another processor of the node. This capacity is especially advantageous for testing the validity of the process of the invention in the factory without having to connect the manufactured node to another node.

In the example described, since the size of the queue is limited, the communication module Ny incorporating the queue sends the communication module ISLx of the first node a response which indicates whether or not the message has been stored in the queue. In the former case, the response is returned to the module ISLx. This additional characteristic has the advantage of controlling the flow of messages received.

In the example illustrated, the present status of the queue is obtained from the field MTAG of the message by the processor which retrieves the message from the queue. Other possibilities also exist. The one described is simple and efficient and it leaves room for other information which represents the status of the queue. In the example described, the bit E, which represents an empty status of the queue, indicates that the contents of the message read are invalid. The bit F, which represents an overflow status of the queue, indicates that the queue is full and that at least one message received has been rejected. And the bit L indicates that the dequeued message is the last message present in the queue.

Generally, each arrival of a message in a queue could be indicated by an interruption of the operation of a processor of the node. But these interruptions substantially slow the processing of the data in the node. In the example illustrated, a processor of the node incorporating the queue is only notified of the arrival of a message by an interruption if the queue is empty when it receives a message, so that the interruption applies to all the messages which follow the first message, until the operation DEQUEUE is executed. This translates into a substantial gain in the processing performance of the node. In a variant, it is also possible to read what a queue contains at regular intervals. The status of the queue could then be supplied in some way other than through a field of the message. The invention can therefore be adapted to any desired operating data described above make it possible to describe a process for communicating data by transferring messages. It is assumed in this case that the node Ny wants to transfer data contained in a data area in a memory of the node Ny into a data area in a memory of another node Nx. The information which makes it possible to manage the data transfer is exchanged between the nodes Nx and Ny by means of the process for transferring messages of predetermined size, which in this section are command messages. In the preceding section, the messages of predetermined size could have been used to send commands as well as data. This section will distinguish between the data messages to be transferred from the node Ny to the node Nx, which messages can be of any size, and the command messages, the size of which is predetermined.

Figure 14:
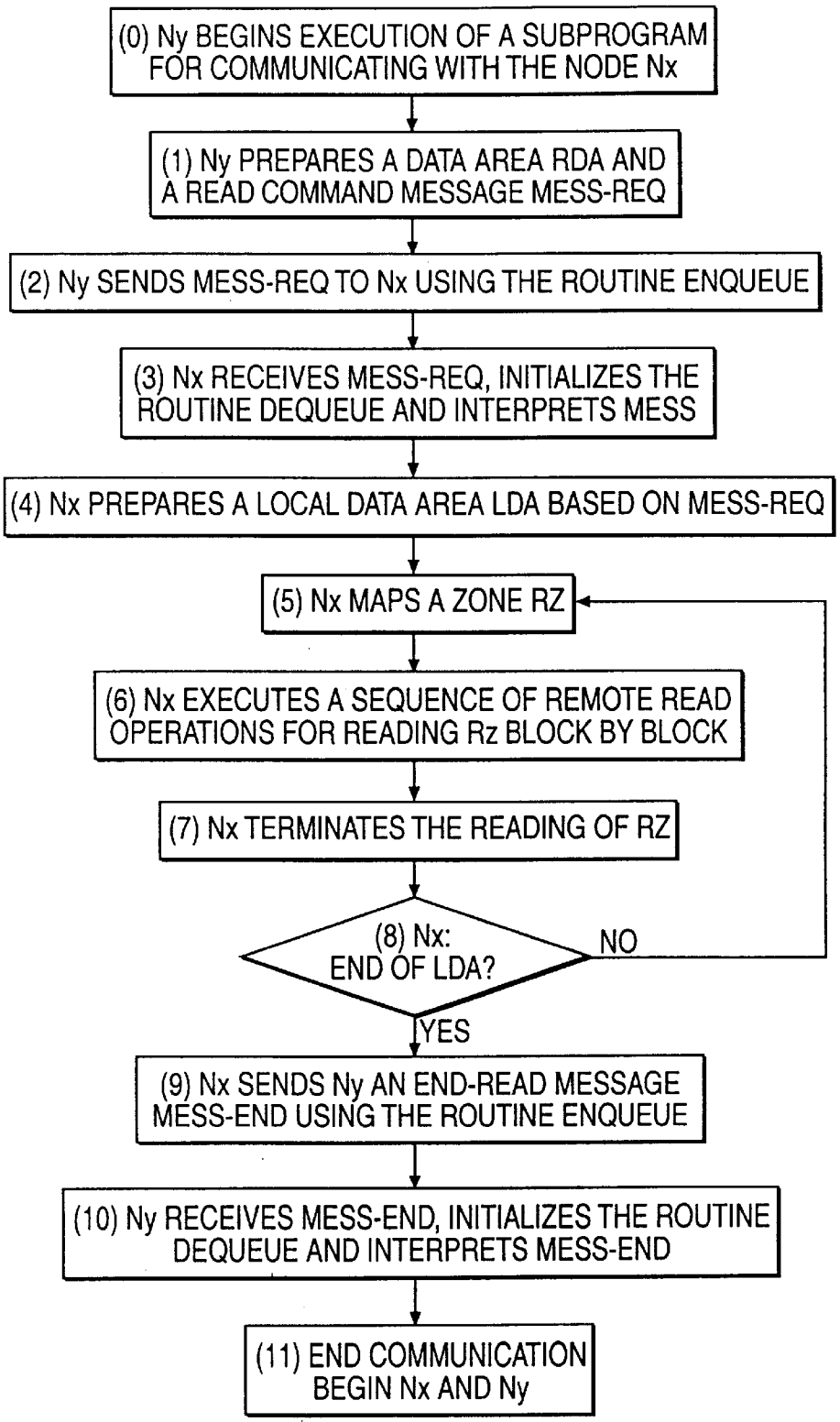
FIG. 14 is a flowchart which illustrates the steps in a process for communicating data by transferring messages, which uses the data transfer process described in reference to FIG. 6 and the message transfer process described in reference to FIG. 11.

FIG. 14 is a flowchart which illustrates an example of the implementation of the process for communicating data by transferring messages between the emitting node Ny and the receiving node Nx.

In step (0) in the flowchart in FIG. 14, the program, which is executed in the node Ny, begins with the execution of a subprogram for communicating with the node Nx.

In step (1)), the node Ny prepares a data area RDA which, for the node Nx, is a remote data area. The operating system of the node Ny:

allocates buffers for containing the area RDA, a buffer in this case being a memory address zone, updates the data to be transferred by writing the data message in the area RDA, marks the buffers so that they remain in memory, prepares a read command message MESS-REQ in order to notify the node Nx that it must perform a remote reading in the buffers which contain the area RDA identified by its characteristics (real address, size, etc.).

In step (2), the node Ny sends the read command message MESS-REQ to the node Nx, using the message enqueuing routine condition of the nodes.

The result is an information system SYS comprising processors Pxm, Pyn distributed in at least a first node Nx and a second Node Ny, each of which has a module ISL for communication with another node by means of a transmission link Lxy and which implements the message transfer process as defined above.

The hardware implementation of the process can be carried out in various ways. In the example illustrated, the queue is constituted by a bank of registers FIFO-MESS having a first address FIFO-IN for executing out the message enqueuing operations and a second address FIFO-OUT for executing the message dequeuing operations. Although each node could have only one queue, each node could contain several receiving queues corresponding to different priorities, all of which are specified by the first and second addresses. In the example illustrated, these two addresses, regardless of their sequence, are respectively contained in a global space GSP and a local space LSP of the input-output address space ISLIO related to the registers which contain the modules of the nodes.

An optional but advantageous characteristic of the process resides in the fact that each communication module ISL illustrated includes an overflow register FIFO-OVF which indicates the identity of the node or nodes in which at least one message has been rejected because the queue was full. According to another advantageous optional characteristic, the arrival of a message is indicated by an interruption of a processor of the second node, which interruption is controlled by a bit associated with the queue in an interruption register FIFO-ITR included in the communication module, which bit has a first value when a message is stored in an empty queue and has a second value through a write operation at the address of this register.

4. Process for Communicating Data by Transferring Messages.

The combined implementation of the process for transferring a message of predetermined size and the process for transferring ENQUEUE.

In step (3), the message MESS-REQ is placed in a queue in the module ISLx of the node Nx. If, as in the example described in the preceding section, the queue was empty, the interruption circuit CKT-ITR emits an interruption signal so that a processor of the node Nx will interrupt its operation and initialize the dequeuing routine DEQUEUE. In each case, the read command message MESS-REQ is dequeued, read and interpreted.

In response, in step (4), the node Nx prepares a local data area LDA for receiving the data. Consequently, it allocates buffers which constitute the local area LDA, which has the characteristics defined by the read command message MESS-REQ or, more generally, which takes these characteristics into account, and invalidates the cache memory inputs related to the blocks which compose the local area LDA.

In step (5), the data transfer begins. In the context of the example illustrated, the transfer is obviously carried out according to the process described in section 2 above. Consequently, the node Nx maps the first remote data zone RZ0 in an entry of the table RMTx using the operation MAP, by:

selecting a free entry in the table where it opens a window W, and initializing an entry in the table RMTx in order to map the real address of the local zone LZ0 in the node Nx with the real address of the zone RZ0 in the node Ny.

In step (6), the node Nx executes a sequence of remote read operations on the blocks which constitute the zone RZ0 contained in the buffers of the node Ny. In case of an abnormal transaction, an error is recorded in the status field ST of the corresponding entry in the table RMT.

In step (7), the node Nx terminates the sequence for transferring data from the zone RZ0 using an operation UNMAP, which returns the status field ST (error condition) and releases the corresponding entry in the table RMT.

In step (8), the node Nx verifies whether or not it has received the entire local data area LDA. Since this is not the case in the example in question, the node Nx maps the next zone RZ1 under the same conditions as in step (5) and then carries out steps (6), (7) and (8). The cycle continues through the last zone RZ4, at which point Nx has obtained all the data requested.

In step (9), the node Nx sends Ny an end-read command message MESS-END, using the routine ENQUEUE.

In step (10), the end-read command message MESS-END is placed in a queue in the module ISLy of the node NY in which, in accordance with the cases described in the preceding section, the interruption circuit CKT-ITR emits an interruption signal so that a processor of the node Ny interrupts its operation and initializes the dequeuing routine DEQUEUE. In each case, the message MESS_END is dequeued, read and interpreted.

Step (11) marks the end of the communication between the nodes Nx and Ny. The buffers of the node Ny which contain RDA are then deallocated.

A variant of this process exists in the case where one or more windows are open permanently. In this case, the buffers of the node Ny are permanently allocated. This determines a maximum size for the data messages to be transferred. The operation MAP in step (5) is not necessary; in step (7) the operation GET-STATUS is used, and in step (11) the buffers of the node Ny are not deallocated, but placed on standby for later use.

It is understood that other variants are also possible. In particular, the example illustrated makes it quite clear that the data transfer can be carried out in accordance with a mode other than that described in section 2 above, which offers numerous advantages. Likewise, the command messages MESS-REQ and MESS-END can be transmitted in ways other than through the process described in section 3, which uses queues.

Generally, the subject of the invention described in this section is a process for communicating data between nodes in an information, each of which nodes Nx, Ny comprises at least one processor Pxm, Pyn, at least one memory Mx, My and a module ISLx, ISLy for communication with another node by means of a communication link Lxy. When a first node Ny wants to send data to a second node Nx, the first node prepares an area RDA for containing these data and sends the communication module ISLx of the second node a read command message MESS-REQ to notify it of the characteristics of the area and to inform it that it must perform a remote reading of this area. In response, the second node Nx prepares a local data area LDA which takes these characteristics into account, executes the remote reading of the area RDA and sends the first node Ny an end-read command message MESS-END.

It has been seen that the area RDA can be of any size and can have a maximum size. The size could also be defined later. Whatever its size, in the example illustrated it is advantageously contained in memory address zones known as buffers. The buffers can be non-contiguous.

Also in the example illustrated, the read command message MESS-REQ contains the list of the addresses and sizes of the buffers which constitute the data area RDA. However, in a possible variant, it would be possible to have the read command message MESS-REQ contain the address and size of a reference buffer which contains the list of the addresses and sizes of the buffers which constitute the data area RDA.

The end-read command message MESS-END has numerous advantages. First of all, indicating the end of the reading to the first node Ny allows this node to control the transfer rate of the data which it has to send to the second node Nx. This prevents the saturation of the receiving node. In accordance with two optional but advantageous characteristics which have been described, the end-read command message MESS-END controls the deallocation of the buffers or their placement on standby, and it also indicates the status of the data transfer. Preferably, in case of error, it also indicates the type of the error. These characteristics offer the advantage of ensuring the integrity of the data message transferred. In case of error, the process can be resumed with the intermediate step related to the sending of the read command message MESS-REQ, since the buffer zones remain allocated or available. Moreover, when it is informed of the type of error, the node can decide based on the type of error not to resend the data message and to inform the manager of the node that a problem must be solved before the desired data can be transmitted correctly.

It has also been seen that the data transfer can be carried out in accordance with various processes and that, in the example illustrated, the remote reading comprises a sequence of remote read operations for reading the data area RDA block by block and is carried out in accordance with the process described in section 2 above. This process can be summarized by saying that the data area RDA comprises at least one data zone RZ0–RZ4, and that a remote read operation of a data zone by the second node Nx consists of opening a window W of correspondence between the memories of the two nodes and using, in the communication module ISLx of the second node Nx, a table of correspondence RMTx between the real address of a local data are LDA in the second node and the real address of the remote data area RDA of the first node Ny so as to transform the reading of the blocks in the local data area LDA into a reading of the blocks in the remote data area RDA. The entry IN-RMT in this table is initialized thanks to the characteristics supplied by the read command message MESS-REQ. This remote read operation is repeated until all of the zones which constitute the data area have been read. In the case in which windows are open permanently, it may be said that the data area RDA comprises at least one data zone RZ0–RZ4, and that a remote read operation of a data zone by the second node Nx consists of having a window of correspondence W permanently open between the memories of the two nodes and of using, in the communication module ISLx of the second node, a table of correspondence RMTx between the real address of a local data area LDA in the second node and the real address of the remote data area RDA of the first node Ny in order to transform the reading of the blocks of the local data area LDA into a reading of the blocks of the data area RDA. Since the window is open permanently, the entry IN-RMT in this table was initialized prior to the arrival of the read command message. This remote read operation is of course repeated until all of the zones constituting the data area RDA have been read. Also preferably, the operations for reading the blocks in the local data area LDA are executed by a processor of the second node, and the communication module of this node behaves like a cache memory of a virtual processor of this node.

Finally, according to the option used in the example in FIG. 14, the read command message MESS-REQ and the end-read command message MESS-END received by the respective nodes are placed in message queues Qhp, Qlp included in the communication modules of the respective nodes ISLx, ISLy, where they are read by a processor of the corresponding node.

The result is an information system SYS comprising processors Pxm, Pyn distributed in at least two nodes Nx, Ny comprising at least one memory and a module for communication with the other node, which two nodes implement the process defined previously. Normally, the memory Mx, My in each node is sufficient. However, it has been seen that the implementation of the data transfer process described in section 2 requires the presence of at least one cache memory. Likewise, as in the processes described above, the process for communicating data by transferring messages is suitable for any system, and the nodes can have any number of processors, and even different numbers of processors. Likewise, although each of the nodes described has its own operating system, all of the nodes, or some of them or none of them could share the same operating system.

We claim:

1. A process for transmitting a message (MESS) between data processors (Pxm, Pyn) in an information system (SYS) distributed in at least a first node (Nx) and a second node (NY), each of which has a module for communication (ISL) with another node by means of a transmission link (Lxy), comprising emitting a message (MESS) of predetermined size, by a first processor of the first node in the form of a write operation (PIO Store) in a first communication module (ISLx) of the first node and transmitting the message through the transmission link (Lxy) to a second communication module (ISLy) of the second node, storing the message in the second communication module in a queue of messages received (Qhp, Qlp) in the order of reception, and retrieving the message from the queue in the form of a read operation (PIO Load) in the second communication module of said second node by a second processor of the second node which incorporates the queue so that the information (SWM) contained in the message can be processed, said storing and retrieving operations being carried out sequentially and signaling the arrival and the overflow status of a message at the second processor of the second node, the queue being constituted by a bank of registers (FIFO-MESS) having a first address (FIFO-IN) for executing message engineering operations and a second address (FIFO-OUT) for executing message dequeuing operations, the first and second addresses being respectively contained in a global space (GSP) visible for all nodes, and in a local space (LSP) only visible for the node where the message is to be received, of an input-output address space (ISLO) related to the registers which contain the modules of said nodes.

2. The process according to claim 1, characterized in that the message emitted by the processor of the first node is intended for said first node, where it is stored in the queue of messages received, in the order of their reception.

3. The process according to claim 1, characterized in that since the size of the queue is limited, the communication module incorporating the queue sends the communication module of the first node a response which indicates whether or not the message has been stored in the queue.

4. The process according to claim 1, characterized in that the current status of the queue is obtained from a field (MTAG) of the message by the second processor which retrieves the message from the queue.

5. The process according to claim 4, characterized in that the field includes at least one bit (E) which represents an empty status of the queue and indicates that the contents of the message read are invalid.

6. The process according to claim 4, characterized in that the field includes at least one bit (F) which represents an overflow status of the queue, indicating that since the queue is full, at least one message received has been rejected.

7. The process according to claim 4, characterized in that the field includes at least one bit (L) which indicates that the dequeued message is the last message in the queue.

8. The process according to claim 1, characterized in that a processor of the node incorporating the queue is only notified of the arrival of a message by an interruption if the queue is empty when it receives a message.

9. An information processing system (SYS) for transmitting messages comprising data processors (Pxm, Pyn) distributed In at least two nodes (Nx) (Ny), each node having a module for communication (ISL) with another node, a transmission link (Lxy) connecting said nodes to implement a message transmission process, a first node including a first processor adapted to emit a message having a predetermined size in the form of a write operation (PIO Store) in a first communication module (ISLx) of the first node and is transmitted, through the transmission link (Lxy), to a second node having a second communication module (ISLy) for storing the message in a queue of messages received (Qhp, Qlp) in the order of reception, and a read operation (PIO Load) retrieving the message from the queue in the second communication module of said second node by a second processor of the second node which incorporates the queue so that the information (SWM) contained in the message can be processed, said storing and retrieving being carried out sequentially in the second node and means for signalizing the arrival and the overflow status of a message to the second processor of the second node, the queue being constituted by a bank of registers (FIFO-MESS) having a first address (FIFO-IN) for executing message enqueuing operations and a second address (FIFO-OUT) for executing message dequeuing operations, the first and second addresses being respectively contained in a global space (GSP) visible for all nodes, and in a local space (LSP) only visible for the node where the message is to be received, of an input-output address space (ISLO) related to the registers which contain the modules of said nodes.

10. The system according to claim 9, characterized in that each of said nodes contains several receiving queues which correspond to different priorities, all of which are specified by said first and second addresses.

11. The system according to claim 9, characterized in that each communication module includes an overflow register (FIFO-OVF) which indicates the identity a the node in which at least one message has been rejected because the queue was full.

12. The system according to claim 9, characterized in that the arrival of a message is indicated by an interruption of a processor of the second node, which interruption is controlled by a bit associated with the queue in an interruption register (FIFO-ITR) included in the second communication module, which bit has a first value when a message is stored in an empty queue and has a second value through a write operation at the address of this register.

13. The system according to claim 9, characterized in that each node has its own operating system.

14. An integrated circuit, characterized in that it incorporates a communication module (ISL) for the implementation of a process for transmitting a message (MESS) between data processors of an information system (SYS), said data processors (Pxm, Pyn) being distributed in at least a first node (Nx) and a second node (Ny), each of which has a module for communication (ISL) with another node, a transmission link (Lxy) for effecting communications between nodes, a first processor for the first node for emitting a message, of predetermined size, in the form of a write operation (PIO Store) in a first communication module (ISLx) of the first node and the transmission link Lxy for transmitting the message to a communication module (ISLy) of the second node, means for storing the message in a queue of messages received (Qhp, Qlp) in the order of reception and a read operation for retrieving messages from the queue in a second communication module of said second node by a second processor of the second node which incorporates the queue so that the information (SWM) contained in the message can be processed, said storing and retrieving operations being carried out sequentially, means for signaling the arrival and the overflow status of a message to the second processor of the second node, and wherein at least said first and second nodes implement the message transmission process, the queue being constituted by a bank of registers (FIFO-MESS) having a first address (FIFO-IN) for executing message enqueuing operations and a second address (FIFO-OUT) for executing message dequeuing operations, the first and second addresses being respectively contained in a global space (GSP) visible for all nodes, and in a local space (LSP) only visible for thenode where the message is to be received, of an input-output address space (ISLO) related to the registers which contain the modules of said nodes.

* * * * *